United States Patent [19]

Anthony

[11] 4,333,798
[45] Jun. 8, 1982

[54] SLEEVE CONNECTION FOR RECONSTITUTABLE CONTROL ROD GUIDE TUBE

[75] Inventor: Andrew J. Anthony, Tariffville, Conn.

[73] Assignee: Combustion Engineering, Inc., Windsor, Conn.

[21] Appl. No.: 102,171

[22] Filed: Dec. 10, 1979

[51] Int. Cl.³ .............................................. G21C 19/20
[52] U.S. Cl. ..................................................... 376/449
[58] Field of Search .................................... 176/76, 78

[56] References Cited

U.S. PATENT DOCUMENTS

| | | | |
|---|---|---|---|
| 3,770,583 | 11/1973 | Klumb | 176/78 |
| 3,992,259 | 11/1976 | Anthony | 176/78 |
| 4,208,248 | 6/1980 | Jabsen | 176/78 |

Primary Examiner—Donald P. Walsh
Attorney, Agent, or Firm—L. James Ristas

[57] ABSTRACT

A reconstitutable nuclear fuel assembly is improved by the placement of a wear sleeve within the control rod guide tube and below the removable guide tube post. The improvement comprises the guide tube having an internal ledge at its upper end from which a flanged, thin-walled metal cylindrical sleeve is suspended. The cylinder is expanded into firm contact with the inner wall of the guide tube over substantially the entire length of the cylinder. The friction fit provided by the firm contact prevents the sleeve from being pushed upward by the flow of coolant through the tube, while the flange and ledge prevent any downward movement of the sleeve in the tube. The flange on the ledge is located in spaced vertical alignment with the lowermost internal portion of the post. Thus, as the sleeve thermally expands it moves upward into the space. The post, however, offers an absolute limit for the upward movement of the sleeve and thereby acts as a redundant vertical stop to prevent the sleeve from becoming dislocated within the post.

4 Claims, 3 Drawing Figures

SLEEVE CONNECTION FOR RECONSTITUTABLE CONTROL ROD GUIDE TUBE

BACKGROUND OF THE INVENTION

This invention relates generally to nuclear reactor fuel assemblies and more particularly to providing a wear sleeve in the control rod guide tube of an assembly whereby vibration of the control rod will not damage the tube.

Nuclear reactors of the pressurized-water type typically have a core region consisting of a multiplicity of vertically oriented fuel assemblies, each assembly containing a matrix of fuel elements. The assembly skeleton includes a plurality of elongated guide tubes to which are connected grids for supporting the fuel elements, and end fittings for securing the assembly between vertically spaced support plates. Each guide tube also serves as a sheath for a control rod which is inserted into the core for the purpose of controlling the heat output of the fuel. An upward flow of liquid is maintained in the guide tube to cool the control rod. Examination of selected fuel assemblies during the refueling of some reactors of this type has revealed the existence of wear patterns on the inside of the guide tubes at the elevation corresponding to the position of the control rod tip within the tube when the rod is in the upper limit of travel, i.e., the unique "withdrawn" position. Such wear behavior has the potential for weakening or perforating the guide tubes. Significant weakening of the tubes is of particular concern during refueling when the full weight of the assembly is borne by its guide tubes.

It is believed the most straight-forward way of avoiding excessive wear of the guide tube is to provide a wear sleeve in the vicinity of the critical region of the tube. It is not a simple matter, however, to design a wear sleeve that is compatable with the many functions a guide tube must perform in a hostile environment. The present invention overcomes these design problems.

SUMMARY OF THE INVENTION

The present invention provides an inexpensive wear sleeve that is easily installed in a reconstitutable control rod guide tube. The sleeve does not interfere with the movement or cooling of the control rod within the tube, and need not be removed from the tube should the assemblies be reconstructed.

The present invention is an improvement in conventional nuclear fuel assemblies which include a control rod guide tube having a removable post at its upper end. The improvement comprises the guide tube having an internal ledge at its upper end from which a flanged, thin-walled metal cylindrical sleeve is suspended. The cylinder is expanded into firm contact with the inner wall of the guide tube over substantially the entire length of the cylinder. The friction fit provided by the firm contact prevents the sleeve from being pushed upward by the flow of coolant through the tube, while the flange and ledge prevent any downward movement of the sleeve in the tube. The flange on the ledge is located in spaced vertical alignment with the lowermost internal portion of the post. Thus, as the sleeve thermally expands it moves upward into the space. The post, however, offers an absolute limit for the upward movement of the sleeve and thereby acts as a redundant vertical stop to prevent the sleeve from becoming dislocated within the post.

In the preferred embodiment the tube is Zircaloy and the post and sleeve are stainless steel. The inner surface of the sleeve is chrome plated for enhanced wear resistance. Since the coefficient of thermal expansion of the steel is greater than that of Zircaloy, the firm contact of the sleeve outer diameter with the tube inner diameter is facilitated by the high temperature associated with operation at power.

BRIEF DESCRIPTION OF THE DRAWINGS

These and other advantages of the invention will be evident from the following description and accompanying drawings in which.

DESCRIPTION OF THE PREFERRED EMBODIMENT

Figure 1:
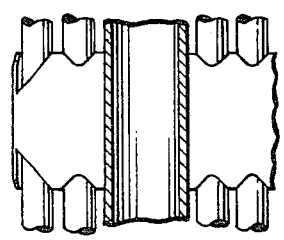
FIG. 1 is an elevation view, partly in section, showing the wear sleeve secured to the guide tube.

FIG. 1 shows a portion of a fuel assembly 10 having a plurality of guide tubes 12 (one shown), wherein the guide tube includes a post 14 removably connected at 16 to the boss 18 of the tube 12. An end plate 20 is engaged between the post 14 and the boss 18. During reactor operation, a downward load (not shown) on the end plate 20 is transferred through the boss 18 and tube 12 whereby the fuel assemby 10 is held down against the coolant flowing upwardly over the fuel elements 22 and fuel element support grids 24. The fuel elements 22 typically extend parallel to the guide tube 12 and terminate just below the end plate 20. The active, heat-producing material in the fuel elements 22 typically extends upward to an elevation approximately six to ten inches below the top of the fuel element. In FIG. 1, the top of the active fuel is indicated at 25.

The guide tube 12 serves as a sheath for the control rod 26 to telescopingly reciprocate therein. The control rod 26 has a unique upper limit position, typically called the fully ¢withdrawn" position, whereby the control rod tip 28 is at or above the top of the active fuel 25. In the illustrated embodiment, the withdrawn position is at about the same elevation as the top of the active fuel 25. The control rod 26 is typically about 14 ft. long, and is suspended at its upper end from the drive mechanism (not shown) which controls its vertical movement. Partly as a result of the cantilevered support of the control rod 26 and the upward coolant flow through the guide tube 12, the withdrawn control rod vibrates against the inner wall of the guide tube 12, producing a wear pattern over a critical region 30 of the tube 12. The guide tube 12 is particularly vulnerable to contact with the control rod 26 because the typical guide tube material is Zircaloy, which is softer than the Inconnel control rod cladding.

The present invention proposes installing a wear sleeve 32 into the guide tube 12 to accommodate the vibratory contact of the control rod tip 28 and prevent wear on the guide tube wall. As will be described in detail with respect to FIG. 3, the upper end of the sleeve 32 is connected between the post 14 and the boss 18 in a way that permits reconstruction of the assembly without the need to remove the sleeve from the guide tube 12. Over substantially the entire length of the sleeve 32, the outer surface of the sleeve is in firm, intimate contact with the inside surface of the guide tube 12. The inner diameter of the sleeve 32 is larger than the outer diameter of the control rod 26 so that the control rod may move freely therein.

Figure 2:
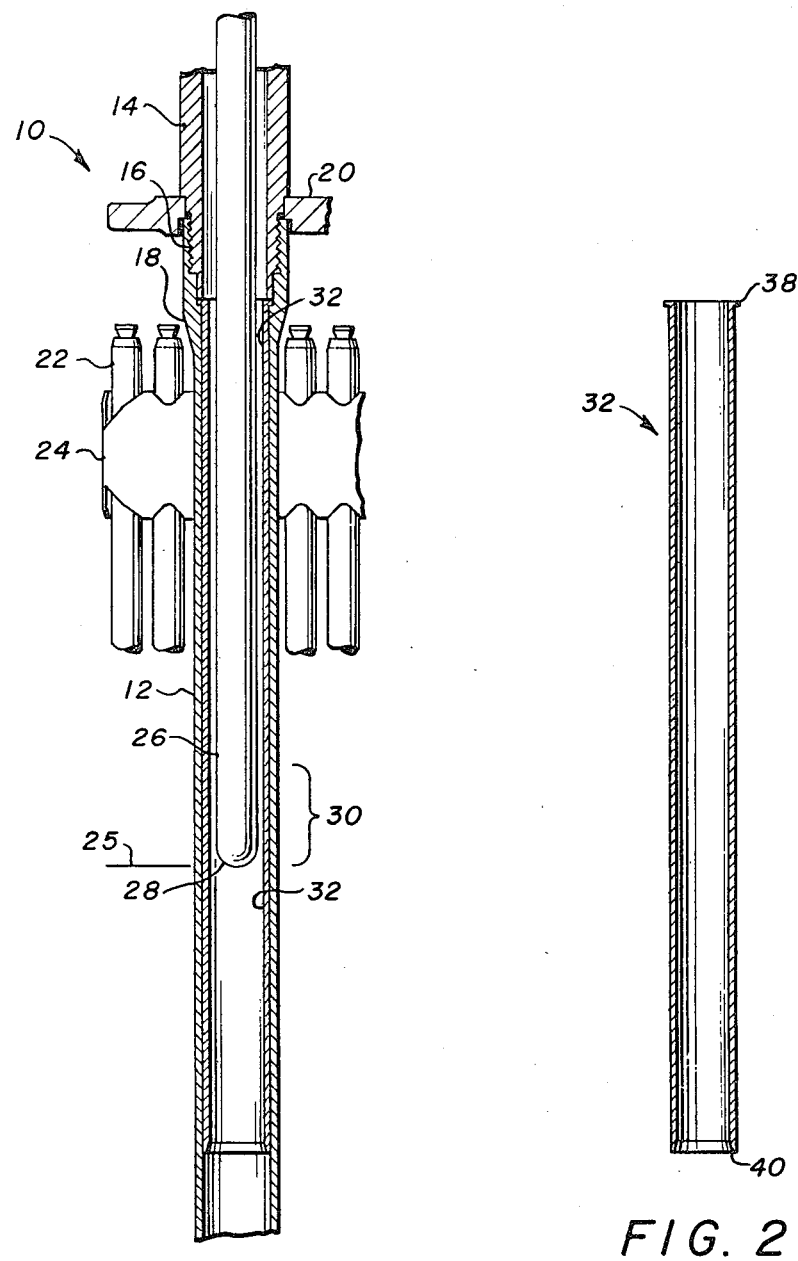
FIG. 2 is an elevation view of the cylindrical sleeve.

Referring now to FIG. 2 the cylindrical, thin-walled sleeve made from Type 304 stainless steel is shown. The sleeve includes a flange 38 at its upper end and a tapered lower end 40. In a typical fuel assembly 10, the outer and inner diameters of the guide tube 12 are 1.115 and 1.035 in. respectively, and the control rod outer diameter is about 0.948 in. Before installation, a suitable sleeve has an outer diameter of 1.025 in. and an inner diameter of 0.984 in. The sleeve length is typically about 15 in. so that the critical region of the guide tube 12 will be approximately at the sleeve mid-plane.

Figure 3:
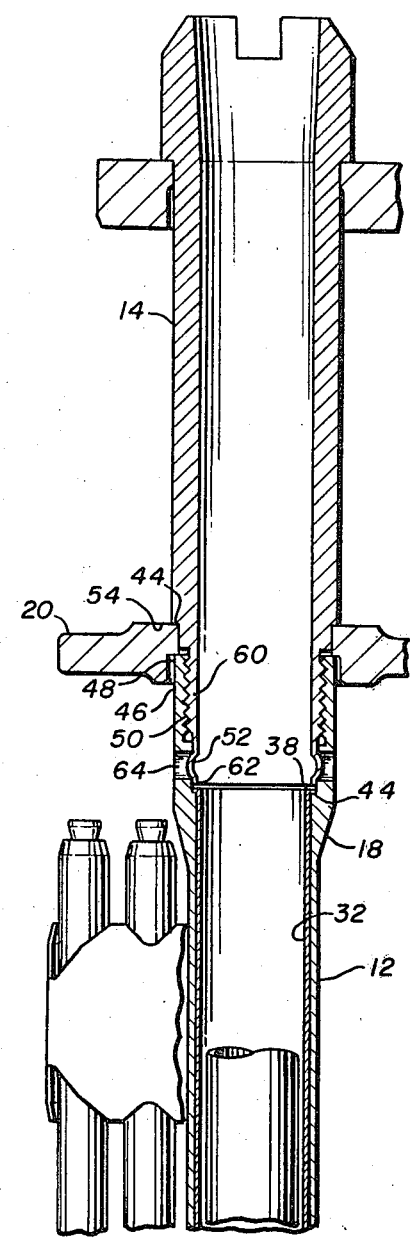
FIG. 3 is a detailed view of the reconstitutable connection shown in FIG. 1.

The sleeve 32 is installed in the guide tube 12 during initial fabrication before the post 14 is connected to the boss 18 and end plate 20. Referring now to FIG. 3, the sleeve 32 is dropped down into the guide tube 12 until the sleeve flange 38 rests on a ledge 44 on the internal surface of the boss 18. The sleeve 32 is then expanded over substantially its entire length so that the average cold diametral gap between the outer diameter of the sleeve and the inner diameter of the guide tube does not exceed about 0.0032 in. at any elevation over the length of the sleeve. The guide tube 12 may itself be slightly expanded during this operation, but the permanent increase in the guide tube outer diameter should not exceed 0.005 in.

The expansion of the sleeve 32 not only provides the firm, intimate contact with the tube wall to resist vertical movement of the sleeve 32, but also maximizes the flow area between the control rod 26 and the sleeve 32. This effect, along with the improved radial heat flow from the inner diameter of the sleeve 32 to the outer diameter of the guide tube 12, helps compensate for the purterbation in the normal guide tube properties resulting from the presence of the sleeve. The firm contact over the outer surface of the sleeve also prevents crud from accumulating between the tube and sleeve.

After the sleeve is in place in the guide tube 12, the remainder of the assembly including the end plate 20 and post 14 are joined together. This connection is partly described in U.S. Pat. No. 4,030,975, "Fuel Assembly for a Nuclear Reactor", issued on June 12, 1977, which is hereby incorporated by reference. For the purpose of the present disclosure, this connection and its relation to the sleeve 32 are described as follows. The boss 18 of the guide tube 12 is enlarged to a diameter which is sized to form a close fit with the bore section 46 of the opening in the end plate 20. The boss 18 is provided with internal threads 50 which mate with threads provided on the spindle portion 60 of the post 14. When the members are assemblied the upper end of the boss 18 bears against the end plate first shoulder 48, and the post shoulder 44 engages the end plate second shoulder 54 to form a rigid mechanical connection between the three components. As an added safety feature to prevent rotation of the various parts during operation, the spindles 50 are provided with an axial extension 52 which is deformable into a plurality of indentations 64 formed within the guide tube boss 18.

The lower end 62 of the axial extension 52 is vertically aligned with the flange 38 of the sleeve 32 after all the components have been assembled. The extension end 62 is spaced far enough from the flange 38 so that as the sleeve 32 expands relative to the guide tube 12 during reactor operation, there is room for the flange to move and avoid buckling or warping the sleeve 32. The extension end 62 is located close enough to the flange, however, so that in the unlikely event that the sleeve loosens from the tube 12, the extension end 62 provides a positive stop whereby the sleeve 32 will not rise into the post and become misaligned within the guide tube 12, where it could interfere will proper control rod movement.

From the foregoing description, it may be seen that the present invention provides a simple, effective wear sleeve for installation in reconstitutable control rod guide tubes whereby the initial properties and function of the guide tube are preserved without significant detereoration.

I claim:

1. In a reconstitutable nuclear fuel assembly of the type including a zircaloy control rod guide tube having an internally threaded boss at its upper end removably connected to an externally threaded extension portion of a stainless steel post, and having a critical region within the tube which may be subject to wear from a control rod to be suspended therein, the improvement comprising:

the guide tube boss having an internal ledge below the threads thereof;

a flanged, thin-walled metal cylinder suspended from the ledge within the guide tube and extending downward below the critical region, the cylinder having an inner diameter larger than the control rod outer diameter and an outer surface in firm contact with the tube inner surface over substantially the entire length of the cylinder;

and the lowermost internal extension of the post being in vertical alignment with but slightly spaced form the flange, whereby the cylinder may freely expand toward the post but is restrained from moving upward into the post.

2. The fuel assembly of claim 1 wherein the cylinder has a higher coefficient of thermal expansion than that of the tube.

3. The fuel assembly of claim 1 wherein the inner surface of the cylinder is coated with a wear-resistant material.

4. The fuel assembly of claim 2 wherein the average cold diametral gap between the outer diameter of the sleeve and the inner diameter of the tube does not exceed about 0.0032 in. at any elevation over the length of the sleeve.

* * * * *